US012203789B2

(12) United States Patent
Van Niekerk et al.

(10) Patent No.: US 12,203,789 B2
(45) Date of Patent: Jan. 21, 2025

(54) WATER MANAGEMENT SYSTEM

(71) Applicant: Connected Sensors LLC, Woodbridge (CA)

(72) Inventors: Johann Van Niekerk, St. Thomas (CA); Simon Brunet, Mississauga (CA)

(73) Assignee: Connected Sensors LLC, Woodbridge (CA)

( * ) Notice: Subject to any disclaimer, the term of this patent is extended or adjusted under 35 U.S.C. 154(b) by 253 days.

(21) Appl. No.: 18/052,346

(22) Filed: Nov. 3, 2022

(65) Prior Publication Data
US 2024/0151565 A1 May 9, 2024

(51) Int. Cl.
*G01F 1/60* (2006.01)
*G01F 15/063* (2022.01)

(52) U.S. Cl.
CPC ............ *G01F 1/60* (2013.01); *G01F 15/063* (2013.01)

(58) Field of Classification Search
None
See application file for complete search history.

(56) References Cited

U.S. PATENT DOCUMENTS

| | | | | |
|---|---|---|---|---|
| 8,994,551 | B2* | 3/2015 | Pitchford | G01D 21/00 340/870.07 |
| 9,105,181 | B2* | 8/2015 | Pitchford | G01F 3/12 |
| 10,060,775 | B2* | 8/2018 | Ruiz Cortez | G01F 1/075 |
| 10,267,651 | B2* | 4/2019 | Pedreiro | G01D 4/002 |
| 10,935,402 | B2* | 3/2021 | Foss | G01M 3/26 |
| 10,965,488 | B2* | 3/2021 | Wright | G01F 1/075 |
| 11,549,837 | B2* | 1/2023 | Klicpera | G01M 3/26 |

* cited by examiner

*Primary Examiner* — Peter J Macchiarolo
*Assistant Examiner* — Jermaine L Jenkins
(74) *Attorney, Agent, or Firm* — Orin Del Vecchio

(57) ABSTRACT

A water management system having an integrated independent power supply that is configured to be operably coupled to a water meter wherein the invention is operable to provide continuous monitoring of water flow into a structure by measuring magnetic field data generated by a water meter. The invention includes a first sensor assembly and a second sensor assembly that are configured to be operably coupled to a water meter. The second sensor assembly facilitates the ability to capture data from single or compound water meter. The first sensor assembly includes a magnetometer operable to measure a magnetic field produced by a rotating magnet in the water meter. The magnetic field data is converted into a square wave which is wirelessly transmitted to an external computing device. The second sensor assembly functions identically as the first sensor assembly wherein the data therefrom is transmitted to the first sensor assembly for transmission.

12 Claims, 3 Drawing Sheets

WATER MANAGEMENT SYSTEM

FIELD OF THE INVENTION

The present invention relates generally to water management, more specifically but not by way of limitation, a water management system wherein the system of the present invention includes a first water flow sensor and a second water flow sensor configured to be operably coupled to a conventional single or compound water meter wherein the present invention provides real time and historical water consumption data.

BACKGROUND

As is known in the art most water meters employed in commercial and residential structures are positive displacement meters. The meters have disposed within the interior volume thereof a measuring chamber wherein the water flows into the chamber, typically at the bottom and exits the chamber at the top as a demand from a plumbing fixture occurs. Water flowing through the chamber results in movement of a disc disposed therein. The movement of the disc is mechanically transferred to a spinning or rotational device that is operably coupled to a magnet. The magnet is magnetically connected to the register of the meter wherein the magnetic pulse results in movement of the sweep hand of the meter register.

While conventional water meters are utilized by utility providers to measure consumption and provide billing for water consumed, they do not provide building owners real time information of water consumption and as such cannot alert a building owner of a potential leak. It is approximate that one in five toilets in existing facilities leak. While the impact of this in a single family residence may not be significant, the impact of this type of leakage in a large multi-family residence can result in tens of thousands of dollars per year in an increase in the cost of ownership of the building. An additional impact of water is the rising unit cost thereof. In North America the cost of water has almost doubled over the last ten years. With an estimate of water loss of up to thirty five percent of water at large residential facilities, controlling water loss and identification thereof is extremely important.

Accordingly, it is intended within the scope of the present invention to provide a water management system that is configured to operably couple to a conventional water meter wherein the present invention provides real time data of water usage and further includes an expansion port with a second sensor configured to operably couple to a compound water meter.

SUMMARY OF THE INVENTION

It is the object of the present invention to provide a water management system configured to provide real time data of water consumption for a building wherein the present invention includes a first sensor assembly.

Another object of the present invention is to provide a water flow measuring device configured to operably coupled to a single or compound water meter wherein the first sensor assembly measures magnetic field fluctuations within a water meter.

A further object of the present invention is to provide a water management system configured to provide real time data of water consumption for a building wherein the first sensor assembly includes an expansion port adapter.

Still another object of the present invention is to provide a water flow measuring device configured to operably coupled to a single or compound water meter wherein the expansion port adapter is configured to be operably coupled to a second sensor assembly.

An additional object of the present invention is to provide a water management system configured to provide real time data of water consumption for a building wherein the second sensor assembly includes a magnetometer operable to detect magnetic field fluctuations.

Yet a further object of the present invention is to provide a water flow measuring device configured to operably coupled to a single or compound water meter wherein the present invention provides continuous water measurement transmitting data thereof utilizing existing wireless infrastructure.

Another object of the present invention is to provide a water management system configured to provide real time data of water consumption for a building wherein the first sensor assembly receives water consumption data from the second sensor assembly and transmit the data via the wireless communication.

Still a further object of the present invention is to provide a water flow measuring device configured to operably coupled to a single or compound water meter wherein the first sensor assembly and second sensor assembly converts the strongest plane sinusoidal wave into a square wave that is tabulated as a pulse in order to calculate water consumption.

Yet another object of the present invention is to provide a water management system configured to provide real time data of water consumption for a building wherein the present invention provides flow rate diagnostics and wherein the present invention includes an integrated power supply.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
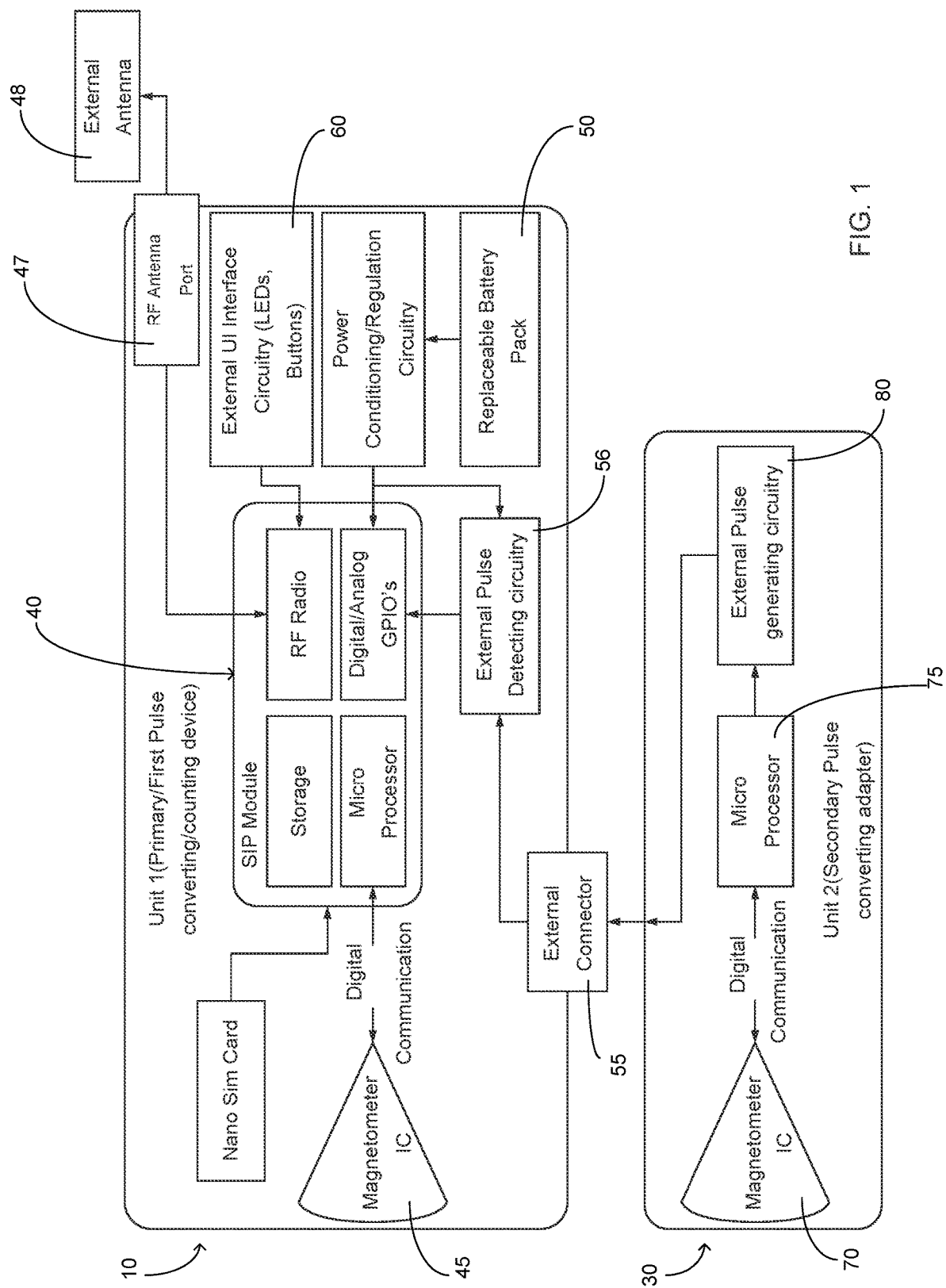
FIG. 1 is a schematic view of the first sensor assembly and the second sensor assembly.
Figure 2:
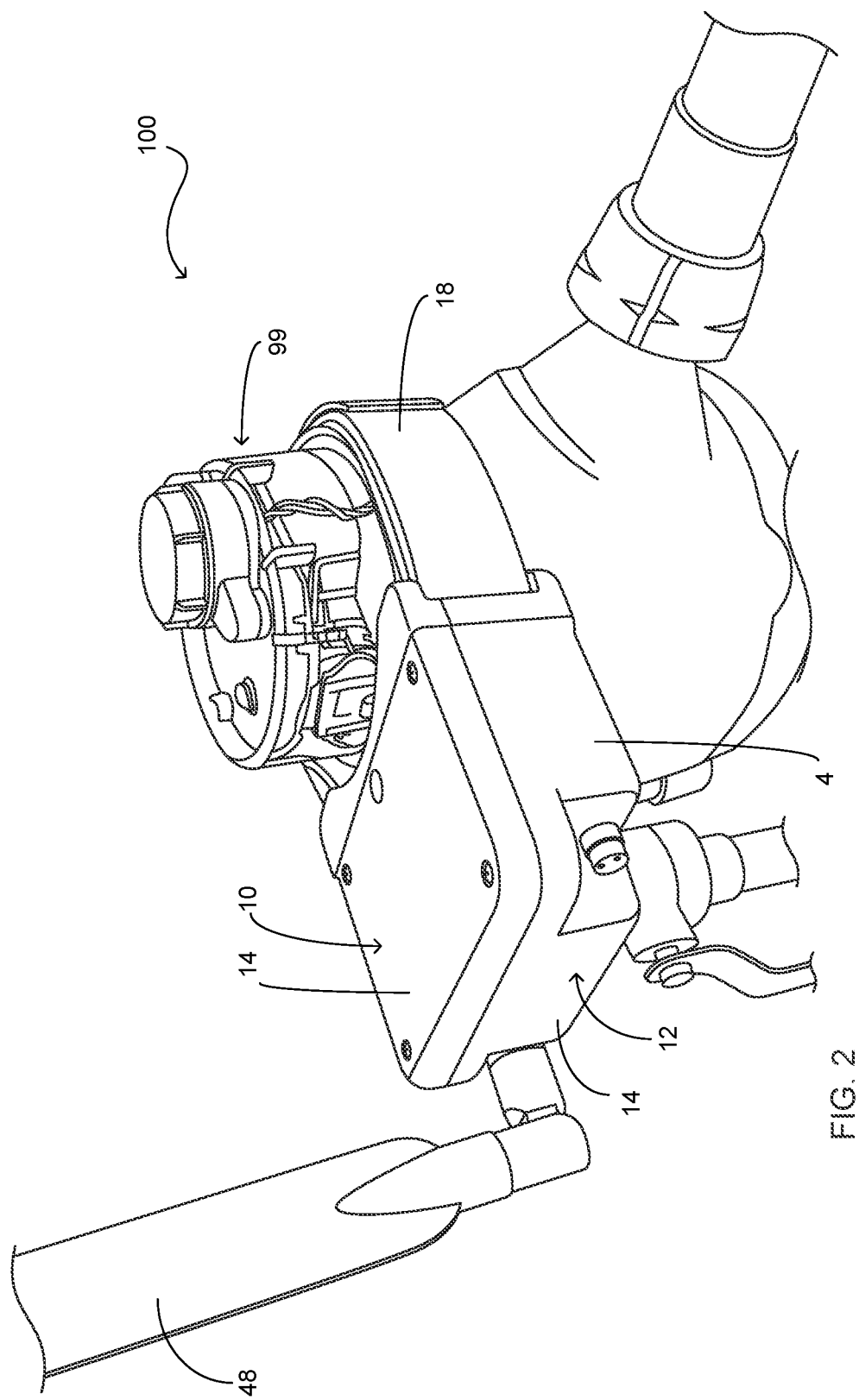
FIG. 2 is a perspective view of the first sensor assembly coupled to an exemplary water meter.
Figure 3:
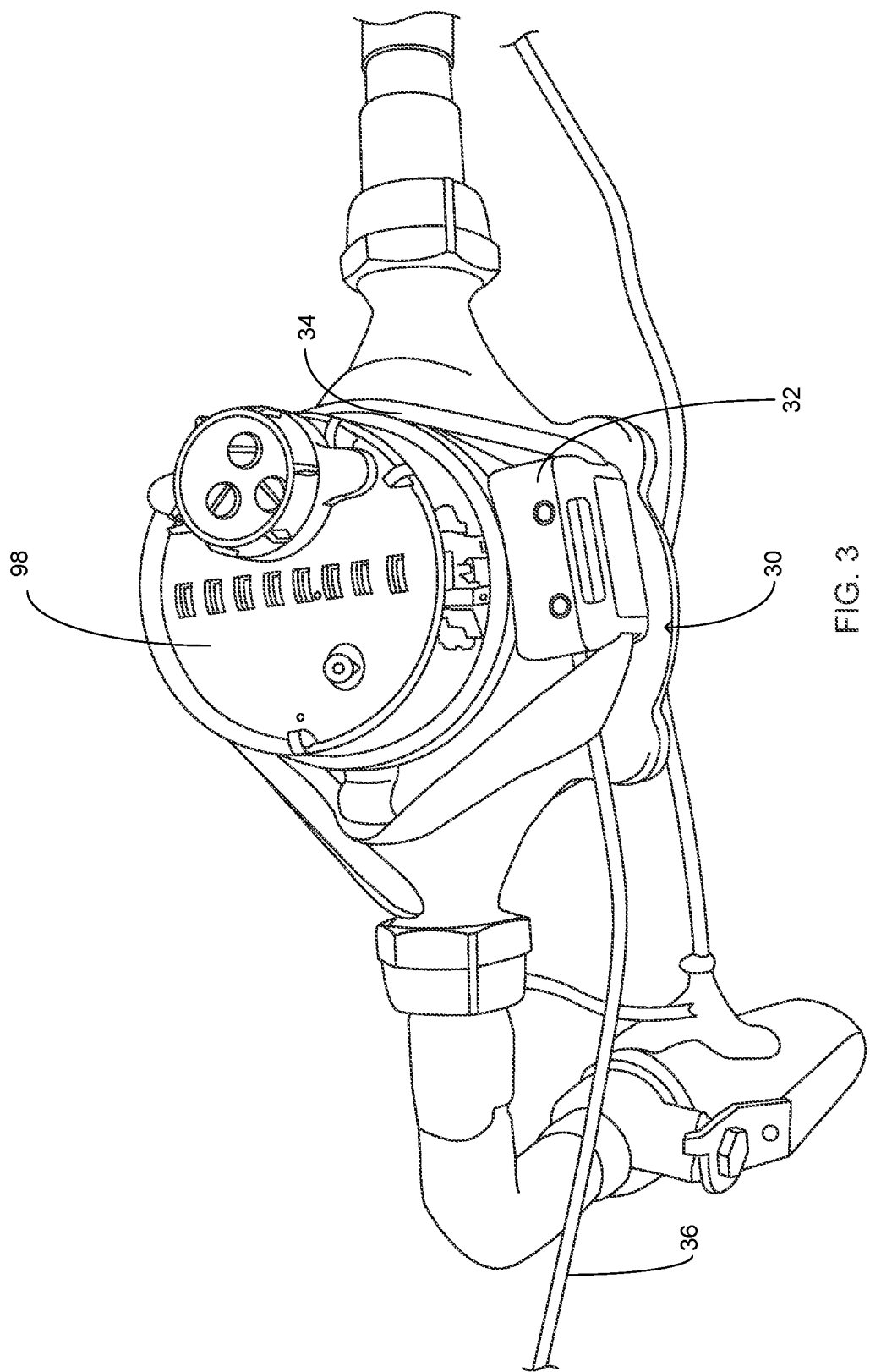
FIG. 3 is a perspective view of the second sensor assembly coupled to an exemplary water meter.

Referring now to the drawings submitted herewith, wherein various elements depicted therein are not necessarily drawn to scale and wherein through the views and figures like elements are referenced with identical reference numerals, there is illustrated a water management system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to Figures herein, the water management system 100 includes a first sensor assembly 10. The first sensor assembly 10 includes housing 12 wherein the housing 12 includes a plurality of walls 14 integrally formed to create an interior volume. The housing 12 is manufactured from a rigid material such as but not limited to plastic and is further manufactured to be weatherproof. The housing 12 is releasably coupled to exemplary meter 99 utilizing a strap member 18. Strap member 18 is an adjustable strap and is manufactured from a suitable durable material. It should be understood within the scope of the present invention that the housing 12 could be provided in alternate sizes and shapes and that the housing 12 could be releasably secured to meter 99 employing alternate elements in place of and/or in conjunction with the strap member 18. A second sensor assembly 30 is included with the water management system 100. It should be understood within the scope of the present invention that the water management system 100 could be employed either with or without the second sensor assembly 30. The second sensor assembly 30 is manufactured similarly as the first sensor assembly 10 and includes strap member 34 that is configured to releasably secure the second sensor assembly 30 to meter 98. As is further discussed herein, the second sensor assembly 30 is operably coupled to the first sensor assembly 10 with cable 36.

Referring in particular to FIG. 1, a block diagram of the electronic components of the first sensor assembly 10 and second sensor assembly 30 are diagrammed therein. The first sensor assembly 10 includes a controller 40. Controller 40 includes the necessary electronic components so as to facilitate manipulation, transmission, capture and storage of data. Operably coupled to the controller 40 is magnetometer 45. The magnetometer 45 is configured to detect magnetic field fluctuations from a rotating magnet that is found in the meter 99. The rotating magnet present in the meter 99 creates a magnetic field that is presented as a sinusoidal wave form in the Z, X and Y planes. As the magnetic field fluctuations are detected and transmitted to the controller 40, the sinusoidal wave is converted into a square wave. The controller 40 records the square waves similar to that of a pulse wherein the pulse data is transmitted to an external computing device via antenna 48 which is coupled to antenna port 47. The antenna 48 is a conventional RF antenna and it should be understood within the scope of the present invention that the data could be transmitted utilizing alternate types of wireless transmission, with a preferred embodiment of LTE-m wireless communication protocols. By way of example but not limitation, in a preferred embodiment of the water management system 100 employs cellular frequencies in the 450 to 2700 mhz LTE-M (preferably 698 to 748 mhz) as this facilitates utilization of the power source 50 and does not require an external gateway or power source.

The first sensor assembly 10 includes a power source 50 wherein the power source 50 provides the necessary power to operate the first sensor assembly 10. It should be understood within the scope of the present invention that the power source 50 could be but not limited to a non-rechargeable, replaceable lithium thionyl chloride batteries. The power source 50 of the water management system 100 is an internal power supply that eliminates any need for any external power and further supplies the necessary power for operation of the second sensor assembly 30 if operably coupled. An external user interface 60 is provided wherein the user interface 60 is operably coupled to the controller 40. User interface 60 provides features such as but not limited to status lights and control interfaces so as to facilitate operation of the first sensor assembly 10.

The first sensor assembly 10 includes expansion port adapter 55. Expansion port adapter 55 is operably coupled to controller 40 through pulse detection circuit 56. The second sensor assembly 30 is operably coupled to the first sensor assembly 10 utilizing cable 36 wherein cable 36 is coupled to the expansion port adapter 55. The second sensor assembly 30 includes a magnetometer 70, microprocessor 75 and pulse generation circuit 80 wherein the aforementioned are all operably coupled. The magnetometer 70 functions the same as magnetometer 45 of the first sensor assembly 10 wherein the magnetometer 70 is configured to detect magnetic field fluctuations from a rotating magnet that is found in the meter 98. The rotating magnet present in the meter 98 creates a magnetic field that is presented as a sinusoidal wave form in the Z, X and Y planes. As magnetic field fluctuations are detected the second sensor assembly 30 employing the microprocessor 75 and pulse generation circuit 80 transmits a signal to the first sensor assembly 10 via cable 36. As with the first sensor assembly 10, the second sensor assembly 30 converts the sinusoidal wave into a square wave for capture and recording thereof. It is contemplated within the scope of the present invention that the signal wave conversion could be executed either in the microprocessor 75 or via the pulse generation circuit 80. For both the first sensor assembly 10 and second sensor assembly 30 the signal data is continuously captured from the locations to which the first sensor assembly 10 and second sensor assembly 30 are coupled and subsequently transmitted to an external computing device. The continuous signal data capture facilitates the ability to provide real time and historical data for parameters such as but not limited to water flow and consumption. By way of example but not limitation, the signal data is employed to determine peak utilization and deviations from standards during non-peak times that may indicate a leak in the water system to which the water management system 100 is operably coupled.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A water management system that is configured to provide continuous monitoring of water through an operable connection to a water meter wherein the water management system comprises:
    a first sensor assembly, said first sensor assembly being operably coupled to a first location on the water meter, said first sensor assembly having a housing, said housing comprised of a plurality of walls forming an interior volume, said first sensor assembly having disposed in said interior volume a controller, said controller having necessary electronics to store, receive, transmit and manipulate data, said first sensor assembly further having a magnetometer, said magnetometer operable to detect a magnetic field being generated by the water meter at said first location, said magnetometer operably coupled to said controller and configured to transmit data on the magnetic field thereto, said first sensor assembly being communicably coupled to a remote computing device, said first sensor assembly having a power supply, said power supply being disposed within said housing;
    a second sensor assembly, said second sensor assembly being releasably secured to the water meter at a second location thereon, said second sensor assembly having a magnetometer, said magnetometer of said second sensor assembly configured to detect and measure a magnetic field from the second location of the water meter, said second sensor assembly operably coupled to said first sensor assembly; and
    wherein said second sensor assembly is configured to transmit magnetic field data to said first sensor assembly wherein the first sensor assembly provides transmission of the magnetic field data of the second sensor assembly to the remote computing device.

2. The water management system configured to provide continuous monitoring of water flowing through the water meter as recited in claim 1, wherein said first sensor assembly is operable to convert a measured sinusoidal wave from the magnetic field present at the first location into a square wave wherein the square wave is counted as a pulse.

3. The water management system configured to provide continuous monitoring of water flowing through the water meter as recited in claim 2, wherein the second sensor assembly is operably coupled to the first sensor assembly utilizing a cable.

4. The water management system configured to provide continuous monitoring of water flowing through the water meter as recited in claim 3, wherein the first sensor assembly further includes an expansion port, said expansion port configured to be operably coupled to said cable.

5. The water management system configured to provide continuous monitoring of water flowing through the water meter as recited in claim 4, wherein said first sensor assembly further includes an antenna port, said antenna port having operably coupled thereto an antenna, said antenna operable to transmit data from said controller of said first sensor assembly to a remote computing device.

6. The water management system configured to provide continuous monitoring of water flowing through the water meter as recited in claim 5, wherein the magnetic field data from said second location is converted from a sinusoidal wave to a square wave for transmission thereof.

7. The water management system configured to provide continuous monitoring of water flowing through the water meter as recited in claim 6, wherein said second sensor assembly includes a controller, said controller of said second sensor assembly being operably coupled to said magnetometer of said second sensor assembly, said controller of said second sensor assembly having necessary electronics to store, receive, transmit and manipulate data.

8. The water management system configured to provide continuous monitoring of water flowing through the water meter as recited in claim 7, wherein said first sensor assembly further includes an external user interface, said external user interface configured to provide operation of the first sensor assembly.

9. The water management system configured to provide continuous monitoring of water flowing through the water meter as recited in claim 8, wherein the water management system collects magnetic field data from said first location and said second location simultaneously.

10. The water management system configured to provide continuous monitoring of water flowing through the water meter as recited in claim 9, wherein the water management system employs wireless communication protocols utilizing a bandwidth between 450 and 2700 mhz LTE-M.

11. The water management system configured to provide continuous monitoring of water flowing through the water meter as recited in claim 10, wherein the water management system is configured to be operably coupled to a single or compound water meter.

12. The water management system configured to provide continuous monitoring of water flowing through the water meter as recited in claim 10, wherein the water management system transmits data from the first location and second location simultaneously.

* * * * *